United States Patent
Hong

(10) Patent No.: US 11,350,300 B2
(45) Date of Patent: May 31, 2022

(54) NETWORK MEASUREMENT METHOD AND DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/760,315

(22) PCT Filed: Dec. 22, 2017

(86) PCT No.: PCT/CN2017/118052
§ 371 (c)(1),
(2) Date: Apr. 29, 2020

(87) PCT Pub. No.: WO2019/119432
PCT Pub. Date: Jun. 27, 2019

(65) Prior Publication Data
US 2020/0344627 A1     Oct. 29, 2020

(51) Int. Cl.
*H04W 24/08* (2009.01)
*H04W 24/10* (2009.01)
(Continued)

(52) U.S. Cl.
CPC .......... *H04W 24/10* (2013.01); *H04W 24/08* (2013.01); *H04W 36/0058* (2018.08);
(Continued)

(58) Field of Classification Search
CPC .......... H04B 17/0082–3913; H04W 8/22–245; H04W 24/02–10; H04W 36/0005–385;
(Continued)

(56) References Cited

U.S. PATENT DOCUMENTS

2013/0039203 A1  2/2013  Fong et al.
2013/0171995 A1  7/2013  Fujishiro et al.
(Continued)

FOREIGN PATENT DOCUMENTS

CN   101964994 A   2/2011
CN   102761901 A   10/2012
(Continued)

OTHER PUBLICATIONS

Extended European Search Report in counterpart EP Application No. 17935243.0 dated Nov. 10, 2020.
(Continued)

*Primary Examiner* — Timothy J Weidner
(74) *Attorney, Agent, or Firm* — Finnegan, Henderson, Farabow, Garrett & Dunner, L.L.P.

(57) ABSTRACT

A network measuring method includes: after a terminal accesses a first cell, receiving at least two pieces of measurement configuring information transmitted by a base station corresponding to the first cell, wherein the at least two pieces of measurement configuring information correspond to at least two speed intervals, so that the terminal can select target measurement configuring information from the at least two pieces of measurement configuring information according to its own movement speed, and performing network measurement according to the target measurement configuring information.

16 Claims, 4 Drawing Sheets

---

After a terminal accesses a first cell, sending, by a base station corresponding to the first cell, at least two pieces of measurement configuration information to the terminal, wherein the at least two pieces of measurement configuration information correspond to at least two speed intervals — 301

Receiving, by the terminal, the at least two pieces of measurement configuration information sent by the base station — 302

Selecting, by the terminal, target measurement configuration information from the at least two pieces of measurement configuration information according to the movement speed of the terminal — 303

Performing, by the terminal, network measurement according to the target measurement configuration information — 304

(51) Int. Cl.
  *H04W 36/00* (2009.01)
  *H04W 36/30* (2009.01)
  *H04W 36/32* (2009.01)
  *H04W 64/00* (2009.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC . *H04W 36/0085* (2018.08); *H04W 36/00837* (2018.08); *H04W 36/30* (2013.01); *H04W 36/32* (2013.01); *H04W 64/006* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC . H04W 48/02–20; H04W 64/003–006; H04W 72/005–14; H04W 84/005–22; H04W 88/005–188; H04W 92/02; H04W 92/04; H04W 92/10
  See application file for complete search history.

(56) References Cited

U.S. PATENT DOCUMENTS

| | | |
|---|---|---|
| 2015/0327100 A1 | 11/2015 | Yang et al. |
| 2016/0044569 A1* | 2/2016 | Lunden ............. H04W 36/0058 |
| 2016/0302123 A1* | 10/2016 | Fujishiro ............... H04W 36/32 |
| 2018/0255489 A1 | 9/2018 | Xu et al. |
| 2018/0302817 A1* | 10/2018 | Teshima ................ H04W 24/10 |
| 2020/0187033 A1* | 6/2020 | Tang ................ H04W 36/0088 |

FOREIGN PATENT DOCUMENTS

| | | |
|---|---|---|
| CN | 105592496 A | 5/2016 |
| CN | 106550412 A | 3/2017 |
| EP | 1 304 898 A1 | 4/2003 |
| EP | 3 062 557 A1 | 8/2016 |
| WO | WO 2011/123744 A1 | 10/2011 |
| WO | WO 2014/163644 A1 | 10/2014 |

OTHER PUBLICATIONS

CATT, Considerations on Cell Reselection in High Speed Railway Scenario, 3GPP TSG-RAN WG2 Meeting #100, R2-1712875, Reno, USA; Nov. 27, 2017-Dec. 1, 2017, 2 pages.

LG Electronics Inc., Idle measurement enhancement using UE speed, 3GPP TSG-RAN WG2 Meeting NR AH#2, R2-1706933, Tsingdao, China, Jun. 27-29, 2017, 3 pages.

Intel Corporation et al., Cell reselection for the UE on high-speed-dedicated network, 3GPP TSG RAN WG2 Meeting #100, R2-1712616, Reno, United State; Nov. 30, 2017-Dec. 3, 2017, 4 pages.

3GPP TS 36.304, V14.4.0 (Sep. 2017), 3rd Generation Partnership Project; Technical Specification Group Radio Access Network; Evolved Universal Terrestrial Radio Access (E-UTRA); User Equipment (UE) procedures in idle mode (Release 14), Sep. 25, 2017, pp. 1-49.

International Search Report and Written Opinion of PCT Application No. PCT/CN2017/118052 dated Sep. 11, 2018.

Office Action dated Dec. 15, 2021, from the State Intellectual Property Office of People's Republic of China issued in counterpart Chinese Application No. 201780002165.4.

* cited by examiner

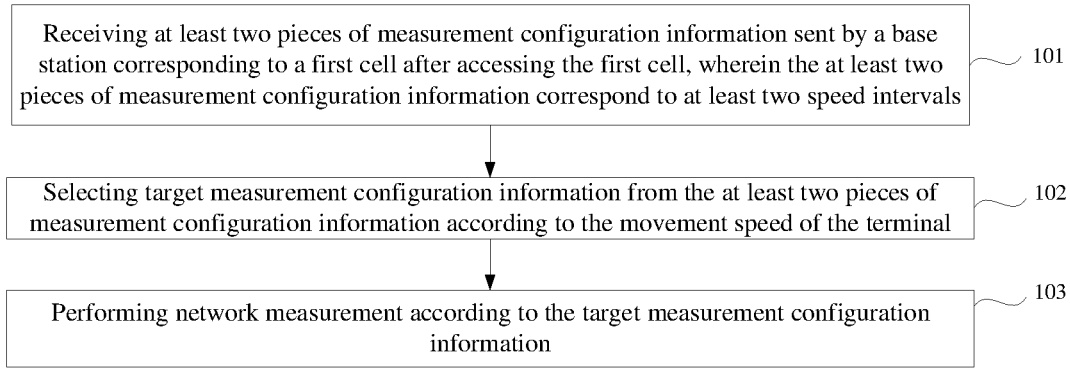
Fig. 1
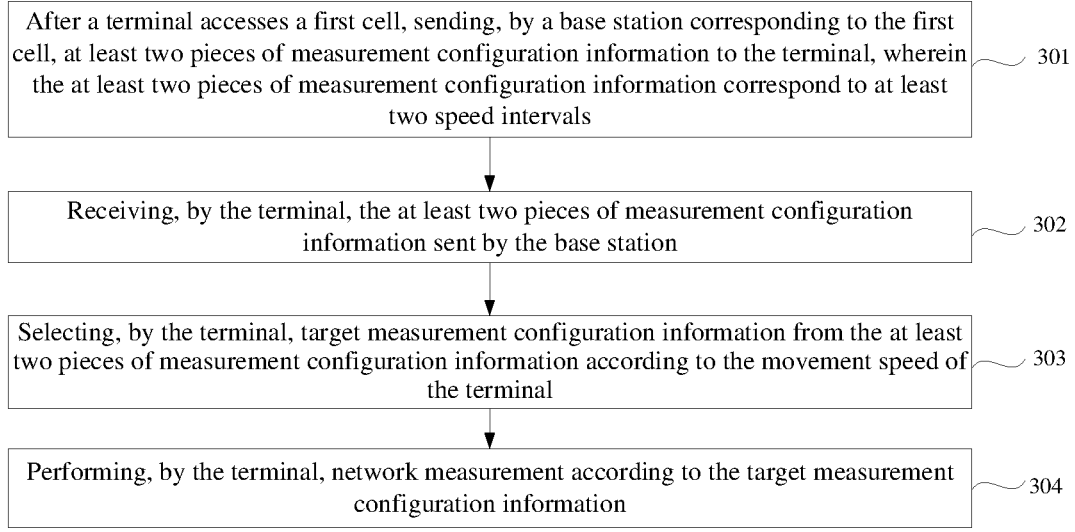
Fig. 2
Fig. 3

NETWORK MEASUREMENT METHOD AND DEVICE, AND STORAGE MEDIUM

CROSS REFERENCE TO RELATED APPLICATIONS

This application is a national phase application based on PCT/CN2017/118052, filed Dec. 22, 2017, the content of which is incorporated herein by reference.

TECHNICAL FIELD

The present disclosure relates to the technical field of communication, and in particular, to a network measurement method and device, and a storage medium.

BACKGROUND

Currently, in order to improve the communication quality of different types of terminals, operators may deploy different types of networks for different types of terminals. That is, the operators may provide specified networks for specified types of terminals. For example, in order to improve the communication quality of terminals on a high-speed-railway, the operators deploy a high-speed-railway dedicated network in addition to a public LTE (Long Term Evolution) network, the high-speed-railway dedicated network dedicating to serving the terminals on the high-speed-railway. In addition, after a terminal accesses a certain cell in a specified network, in order to maintain the communication quality of the terminal, the terminal needs to measure the signal quality of the currently accessed serving cell and the neighboring cells of the serving cell according to the instruction of a base station, that is, performing network measurement and reporting a measurement report to the base station, so that the base station re-determines a cell that the terminal needs to access according to the measurement report.

In related art, after a terminal accesses a cell of a specified network, a base station sends measurement configuration information to the terminal, the measurement configuration information including a measurement trigger event, a measurement parameter, and a measurement report trigger event. The measurement trigger event and the measurement report trigger event are that the signal quality of a serving cell is less than a threshold, and the measurement parameter includes the signal quality of each of neighboring cells. That is, the terminal measures the signal quality of the serving cell in real time after receiving the measurement configuration information, and when the signal quality of the serving cell is less than the threshold, the terminal measures the signal quality of each of the neighboring cells and sends a measurement report to the base station, the measurement report carrying the signal quality of each of the neighboring cells.

SUMMARY

According to a first aspect of embodiments of the present disclosure, a network measurement method applied to a terminal is provided. The method includes:

receiving at least two pieces of measurement configuration information sent by a base station corresponding to a first cell after accessing the first cell, wherein the at least two pieces of measurement configuration information correspond to at least two speed intervals;

selecting target measurement configuration information from the at least two pieces of measurement configuration information according to the movement speed of the terminal; and performing network measurement according to the target measurement configuration information.

According to a second aspect of embodiments of the present disclosure, a network measurement method applied to a base station is provided. The method includes:

sending at least two pieces of measurement configuration information to a terminal, wherein the at least two pieces of measurement configuration information correspond to at least two speed intervals and are configured to instruct the terminal to select target measurement configuration information for network measurement according to the movement speed of the terminal, and the terminal is a terminal that accesses a first cell corresponding to the base station.

According to a third aspect of embodiments of the present disclosure, a terminal includes:

a processor; and a memory for storing processor-executable instructions, wherein the processor is configured to execute the steps of any of the method according to the above-mentioned first aspect.

According to a fourth aspect of embodiments of the present disclosure, a base station includes:

a processor; and a memory for storing processor-executable instructions, wherein the processor is configured to execute the steps of any of the method according to the above-mentioned second aspect.

The technical solutions provided by embodiments of the present disclosure may include the following benefits.

In the embodiment of the present disclosure, a terminal receives at least two pieces of measurement configuration information sent by a base station corresponding to a first cell after accessing the first cell, wherein the at least two pieces of measurement configuration information correspond to at least two speed intervals, so that the terminal can select target measurement configuration information from the at least two pieces of measurement configuration information according to its own movement speed, and perform network measurement according to the target measurement configuration information. That is, in the present disclosure, as the base station will send multiple pieces of measurement configuration information, the terminal can select appropriate measurement configuration information for network measurement according to its own situation, which improves the flexibility of the terminal for network measurement.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

FIG. 1 is a flowchart of a network measurement method according to an embodiment of the present disclosure;

FIG. 2 is a flowchart of another network measurement method according to an embodiment of the present disclosure;

FIG. 3 is a flowchart of another network measurement method according to an embodiment of the present disclosure;

DETAILED DESCRIPTION

Figure 4:
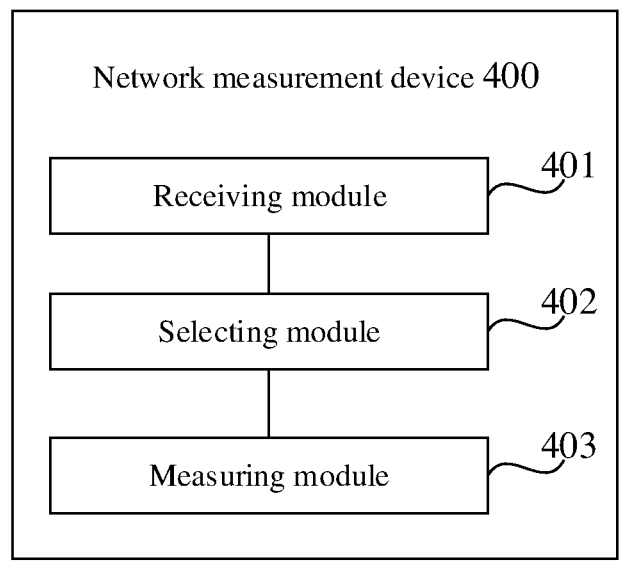
FIG. 4 is a block diagram of a network measurement device according to an embodiment of the present disclosure.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the disclosure as recited in the appended claims.

Before explaining the embodiments of the present disclosure in detail, the application scenarios of the embodiments of the present disclosure are described first. In a measurement reporting method in the related art, a measurement trigger event and a measurement report trigger event are both that the signal quality of a serving cell is less than a threshold. That is, no matter what state the terminal is in, when the signal quality of the serving cell is lower than the threshold, the terminal will measure the signal quality of all neighboring cells and send a measurement report to a base station, which reduces the flexibility of the terminal for network measurement.

Therefore, an embodiment of the present disclosure provides a network measurement method, so that a terminal can select appropriate measurement configuration information for network measurement from at least two pieces of measurement configuration information sent by a base station according to its own situation, thereby improving the flexibility of the terminal for network measurement.

FIG. 1 is a flowchart of a network measurement method according to an embodiment of the present disclosure, which is applied to a terminal. As shown in FIG. 1, the method includes the following steps.

In step 101, at least two pieces of measurement configuration information sent by a base station corresponding to a first cell are received after accessing the first cell, wherein the at least two pieces of measurement configuration information correspond to at least two speed intervals.

In step 102, target measurement configuration information is selected from the at least two pieces of measurement configuration information according to the movement speed of the terminal.

In step 103, network measurement is performed according to the target measurement configuration information.

In the embodiment of the present disclosure, a terminal receives at least two pieces of measurement configuration information sent by a base station corresponding to a first cell after accessing the first cell, wherein the at least two pieces of measurement configuration information correspond to at least two speed intervals, so that the terminal can select target measurement configuration information from the at least two pieces of measurement configuration information according to its own movement speed, and perform network measurement according to the target measurement configuration information. That is, in the present disclosure, as the base station will send multiple pieces of measurement configuration information, the terminal can select appropriate measurement configuration information for network measurement according to its own situation, which improves the flexibility of the terminal for network measurement.

Optionally, the first cell is a cell in a first network, each piece of measurement configuration information includes a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to the second network among all neighboring cells of the first cell; and for each piece of measurement configuration information, the first measurement trigger event is that the signal quality of the first cell is less than a first threshold, the first measurement report trigger event is that there is a second cell in the at least one second cell with signal quality exceeding a second threshold compared with the signal quality of the first cell and an exceeding duration is longer than a first duration, the second measurement trigger event is that the signal quality of each of the at least one second cell is lower than a third threshold, the second measurement report trigger event is that there is a third cell in the at least one third cell with signal quality exceeding a fourth threshold compared with the signal quality of the first cell and an exceeding duration is longer than a second duration, and the first threshold, the first duration, and the second duration are respectively different in the different measurement configuration information, and the third threshold is less than the first threshold in the same measurement configuration information.

Optionally, performing network measurement according to the target measurement configuration information includes:

measuring the signal quality of each of the at least one second cell, when the signal quality of the first cell is less than the first threshold in the target measurement configuration information; and sending a measurement report to the base station, in case that there is a second cell in the at least one second cell with signal quality exceeding the second threshold in the target measurement configuration information compared with the signal quality of the first cell and the exceeding duration is longer than the first duration in the target measurement configuration information, wherein the measurement report carries the signal quality of each of the at least one second cell.

Optionally, after measuring the signal quality of each of the at least one second cell, the method further includes:

measuring the signal quality of each of the at least one third cell, in case that the signal quality of each of the at least one second cell is lower than the third threshold in the target measurement configuration information; and sending a measurement report to the base station, when there is a third cell in the at least one third cell with signal quality exceeding the fourth threshold in the target measurement configuration information compared with the signal quality of the first cell and the exceeding duration is longer than the second duration in the target measurement configuration information, wherein the measurement report carries the signal quality of each of the at least one third cell.

Optionally, the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

All the above-mentioned optional technical solutions can form optional embodiments of the present disclosure according to any combination, and the embodiments of the present disclosure will not be described in detail.

FIG. 2 is a flowchart of another network measurement method according to an embodiment of the present disclosure. The method is applied to a base station. As shown in FIG. 2, the method includes the following steps.

In step 201, at least two pieces of measurement configuration information are sent to a terminal, wherein the at least two pieces of measurement configuration information correspond to at least two speed intervals and are configured to instruct the terminal to select target measurement configuration information for network measurement according to the movement speed of the terminal, and the terminal is a terminal that accesses a first cell corresponding to the base station.

In the embodiment of the present disclosure, a base station may send at least two pieces of measurement configuration information to a terminal that accesses a first cell, wherein the at least two pieces of measurement configuration information correspond to at least two speed intervals, so that the terminal can select target measurement configuration information from the at least two pieces of measurement configuration information according to its own movement speed, and perform network measurement according to the target measurement configuration information. That is, in the present disclosure, as the base station will send multiple pieces of measurement configuration information, the terminal can select appropriate measurement configuration information for network measurement according to its own situation, which improves the flexibility of the terminal for network measurement.

Optionally, the first cell is a cell in a first network, each piece of measurement configuration information includes a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to the second network among all neighboring cells of the first cell; and for each piece of measurement configuration information, the first measurement trigger event is that the signal quality of the first cell is less than a first threshold, the first measurement report trigger event is that there is a second cell in the at least one second cell with signal quality exceeding a second threshold compared with the signal quality of the first cell and an exceeding duration is longer than a first duration, the second measurement trigger event is that the signal quality of each of the at least one second cell is lower than a third threshold, the second measurement report trigger event is that there is a third cell in the at least one third cell with signal quality exceeding a fourth threshold compared with the signal quality of the first cell and an exceeding duration is longer than a second duration, and the first threshold, the first duration, and the second duration are respectively different in the different measurement configuration information, and the third threshold is less than the first threshold in the same measurement configuration information.

Optionally, the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

All the above-mentioned optional technical solutions can form optional embodiments of the present disclosure according to any combination, and the embodiments of the present disclosure will not be described in detail.

FIG. 3 is a flowchart of another network measurement method according to an embodiment of the present disclosure. As shown in FIG. 3, the method includes the following steps.

In step 301, after a terminal accesses a first cell, a base station corresponding to the first cell sends at least two pieces of measurement configuration information to the terminal, wherein the at least two pieces of measurement configuration information correspond to at least two speed intervals.

In the embodiment of the present disclosure, in order to improve the flexibility of a terminal for network measurement, a base station may send at least two pieces of measurement configuration information to a terminal accessing a cell corresponding to the base station, so that the terminal accessing the cell may select appropriate measurement configuration information according to its own situation. That is, after a terminal accesses a first cell, a base station of the first cell will send at least two pieces of measurement configuration information to the terminal.

In a possible implementation, the base station sends two pieces of measurement configuration information to the terminal, which are first measurement configuration information and second measurement configuration information, respectively. The first measurement configuration information corresponds to a first speed interval, and the second measurement configuration information corresponds to a second speed interval. The first speed interval is a speed interval with a value greater than a preset speed, the second speed interval is a speed interval with a value less than the preset speed.

The preset speed is a speed set in advance. For example, when the preset speed is 200 km/h, the first speed interval is greater than 200 km/h, and the second speed interval is less than 200 km/h.

In another possible implementation, the base station sends three pieces of measurement configuration information to the terminal, which are first measurement configuration information, second measurement configuration information, and third measurement configuration information. The first measurement configuration information corresponds to a first speed interval, the second measurement configuration information corresponds to a second speed interval, and the third measurement configuration information corresponds to a third speed interval. The values corresponding to the first speed interval, the second speed interval, and the third speed interval decrease in order.

It should also be noted that, with a network measurement method provided in the related art, in case that there is a cell in neighboring cells which is in other network except for a designated network, the terminal may reside on the cell in the other network, so as to affect the network condition of the other network, and also affect the communication quality of the terminal.

For example, for a terminal on a high-speed-railway, after the terminal accesses a high-speed-railway dedicated network, when the speed of the high-speed-railway changes from fast to slow, such as when the high-speed-railway is currently entering a station, the signal quality of a serving cell accessed by the terminal is deteriorated, that is, the terminal is triggered to measure the signal quality of all neighboring cells, which may cause the terminal on the high-speed-railway to select a cell in the public LTE network in the neighboring cells for residence. On the one hand, it may cause congestion in the public LTE network, and on the other hand, when the speed of the high-speed-railway changes from slow to fast, it may trigger the terminal on the high-speed-railway to re-measure the signal quality of all the neighboring cells, so that the terminal on the high-speed-railway resides to a cell in the high-speed-railway dedicated network again, switches the residential cells frequently, and then affecting the communication quality of the terminal on the high-speed-railway.

Therefore, in the embodiment of the present disclosure, in case that a first network and a second network currently coexist, and the first cell is a cell in the first network, in this case, in order to prevent the terminal from frequently switching cells between different frequencies, for each piece of measurement configuration information, the first cell is a cell in the first network, each piece of measurement configuration information includes a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to the second network among all neighboring cells of the first cell.

That is, in the embodiment of the present disclosure, for each piece of configuration information, two measurement trigger events and two measurement report trigger events are respectively provided to prevent the terminal from directly measuring the signal quality of all neighboring cells when performing network measurement, and further to improve the flexibility of the terminal for network measurement.

In a possible implementation, for each piece of measurement configuration information, the first measurement trigger event is that the signal quality of the first cell is less than a first threshold, the first measurement report trigger event is that there is a second cell in the at least one second cell with signal quality exceeding a second threshold compared with the signal quality of the first cell and an exceeding duration is longer than a first duration, the second measurement trigger event is that the signal quality of each of the at least one second cell is lower than a third threshold, the second measurement report trigger event is that there is a third cell in the at least one third cell with signal quality exceeding a fourth threshold compared with the signal quality of the first cell and an exceeding duration is longer than a second duration.

That is, after accessing the first cell, the terminal preferentially performs network measurement on a neighboring cell belonging to the same network as the first cell among the neighboring cells in case that the signal quality of the first cell is lower than the first threshold, that is, preferentially measures the signal quality of the at least one second cell, so that the terminal preferentially switches to a neighboring cell belonging to the same network as the first cell even if the terminal switches cells. Only when the signal quality of each of the at least one second cell is lower than the third threshold, the terminal measures the signal quality of a neighboring cell that does not belong to the same network as the first cell in the neighboring cells, that is, measures the signal quality of the at least one third cell.

In addition, as the at least two pieces of measurement configuration information sent by the base station correspond to the at least two speed intervals, that is, the measurement configuration information corresponding to different speed intervals is also different. In the embodiment of the present disclosure, the first threshold, the first duration, and the second duration are respectively different in the different measurement configuration information, and the third threshold is smaller than the first threshold in the same measurement configuration information.

In a possible implementation, the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

The first threshold, the second threshold, the third threshold, and the fourth threshold are all preset thresholds. The specific values of the four thresholds are not limited in the embodiment of the present disclosure, the four thresholds only need to satisfy the above-mentioned magnitude relationship. In addition, the first duration and the second duration are also preset durations, and the specific values of the two durations are also not limited in the embodiment of the present disclosure, and only needs to satisfy the above-mentioned magnitude relationship.

For example, the measurement configuration information sent by the base station to the terminal is first measurement configuration information and second measurement configuration information. The speed interval corresponding to the first measurement configuration information is greater than 200 km/h, and the speed interval corresponding to the second measurement configuration information is less than 200 km/h. That is, the first measurement configuration information is set for a terminal with a high movement speed, such as for a terminal on a high-speed-railway, and the second measurement configuration information is set for a terminal with a low movement speed, such as for a terminal on a non-high-speed-railway.

At this time, the first duration in the first measurement configuration information is shorter than the first duration in the second measurement configuration information. The second duration in the first measurement configuration information is shorter than the second duration in the second measurement configuration information. The first threshold in the first measurement configuration information is greater than the first threshold in the second measurement configuration information.

In step 302, the terminal receives the at least two pieces of measurement configuration information sent by the base station.

After the base station sends the at least two pieces of measurement configuration information through step 301, the terminal will receive the at least two pieces of measurement configuration information, so that the terminal can select target measurement configuration information from the at least two pieces of measurement configuration information through step 303 described below for network measurement.

In step 303, the terminal selects target measurement configuration information from the at least two pieces of measurement configuration information according to its own movement speed.

It can be known from step 301 that the at least two pieces of measurement configuration information correspond to at least two speed intervals. Therefore, the implementation of step 303 may be: the terminal obtains its own movement speed, selects a speed interval corresponding to its own movement speed from the at least two speed intervals to obtain a target speed interval, and selects measurement configuration information corresponding to the target speed interval from the at least two pieces of measurement configuration information to obtain target measurement configuration information.

Because the terminal selects a speed interval corresponding to its own movement speed from the at least two speed intervals, and then selects a frequency priority order corresponding to the target speed interval from the at least two pieces of measurement configuration information. When the current movement speed of the terminal is large, the target measurement configuration information is measurement configuration information corresponding to a speed interval with a larger value, and when the current movement speed of the terminal is small, the target measurement configuration information is measurement configuration information corresponding to a speed interval with a smaller value.

The implement of determining the current movement speed by the terminal may be as follows. The terminal may determine the current position through GPS (Global Positioning System) positioning technology every preset time period, calculate the distance that the terminal moves within the preset duration based on the determined position, and take the quotient between the distance and the preset duration as the movement speed of the terminal.

In addition, the preset duration is a duration set in advance, which may be 5 s, 10 s, or 30 s, etc.

In step 304, the terminal performs network measurement according to the target measurement configuration information.

It can be known from step 301 that the target configuration information includes a first measurement trigger event, a first measurement report trigger event, at least one second cell to be measured corresponding to the first measurement trigger event, a second measurement trigger event, a second measurement report trigger event and at least one third cell to be measured corresponding to the second measurement trigger event. The first measurement trigger event is that the signal quality of the first cell is less than a first threshold. The first measurement report trigger event is that there is a second cell in the at least one second cell with signal quality exceeding a second threshold compared with the signal quality of the first cell and the exceeding duration is longer than a first duration. The second measurement trigger event is that the signal quality of each of the at least one second cell is lower than a third threshold. The second measurement report trigger event is that there is a third cell in the at least one third cell with signal quality exceeding a fourth threshold compared with the signal quality of the first cell and the exceeding duration is longer than a second duration.

Therefore, the implementation of step 304 may be as follows. The terminal determines the signal quality of the first cell, and determines that the first measurement trigger event meets conditions when the signal quality of the first cell is less than the first threshold in the target measurement configuration information. In this case, the terminal measures the signal quality of each of the at least one second cell, and determine whether there is a second cell in the at least one second cell with signal quality exceeding the second threshold in the target measurement configuration information compared with the signal quality of the first cell according to the signal quality of each of the at least one second cell. In case that the terminal determines that there is a second cell in the at least one second cell with signal quality exceeding the second threshold in the target measurement configuration information compares with the signal quality of the first cell and the exceeding duration is longer than the first duration in the target measurement configuration information, it indicates that the current first measurement report trigger event currently meets the conditions, and at this time, the terminal sends a measurement report to the base station, the measurement report carrying the signal quality of each of the at least one second cell.

That is, when determining that the signal quality of the first cell is less than the first threshold, the terminal preferentially measures the signal quality of at least one second cell belonging to the same network as the first cell. Moreover, the terminal does not immediately report the signal quality of the at least one second cell to the base station, but when the first measurement report trigger event meets the conditions, that is, only when the terminal determines that there is a second cell in the at least one second cell with signal quality exceeding the second threshold in the target measurement configuration information compared with the signal quality of the first cell and the exceeding duration is longer than the first duration in the target measurement configuration information, the terminal sends a measurement report to the base station, which improves the flexibility of the terminal for network measurement.

In addition, because the target configuration information also includes a second measurement trigger event, after measuring the signal quality of each of the at least one second cell, the terminal also needs to determine whether the second measurement trigger event meets conditions, in case that the second measurement trigger event meets the conditions, that is, in case that the signal quality of each of the at least one second cell is lower than the third threshold in the target measurement configuration information, at this time, the terminal measures the signal quality of each of the at least one third cell. And after measuring the signal quality of each of the third cell, when the terminal determines that there is a third cell in the at least one third cell with signal quality exceeding the fourth threshold in the target measurement configuration information compared with the signal quality of the first cell and the exceeding duration is longer than the second duration in the target measurement configuration information, it indicates that the second measurement report trigger event meets the conditions, and at this time, the terminal will send a measurement report to the base station, the measurement report carrying the signal quality of each of the at least one third cell.

That is, after the terminal measures the signal quality of each of the at least one second cell, only when the signal quality of each of the at least one second cell is lower than the third threshold in the target measurement configuration information, the terminal measures the signal quality of at least one third cell that does not belong to the same network as the first cell.

Therefore, with the foregoing network measurement method, when the signal quality of the first cell is deteriorated, the terminal preferentially measures the signal quality of at least one second cell belonging to the same network as the first cell, so as to preferentially switch to the at least one second cell belonging to the same network as the first cell. While only when each of the at least one second cell is poor, the terminal will measure the signal quality of at least one third cell that does not belong to the same network as the first cell, so that the terminal switches to the at least one third cell signal that does not belong to the same network as the first cell. That is, when the signal quality of the first cell that the terminal currently accesses is deteriorated, the terminal will preferentially select the at least one second cell belonging to the same network as the first cell to switch, so as to prevent the terminal from switching cells frequently between cells in different networks.

For example, in case that the first network is a high-speed-railway dedicated network and the terminal is currently on a high-speed-railway, when the signal quality of the first cell that the terminal currently accesses is deteriorated, through the above-mentioned network measurement method, the terminal will preferentially select a cell in the nearby high-speed-railway dedicated network to re-access. Only when the cells in the nearby high-speed-railway dedicated network are all poor, the terminal selects a cell in the nearby public LTE network to re-access.

In addition, the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

That is, in the embodiment of the present disclosure, for a terminal with a high movement speed, when the terminal determines that the signal quality of the first cell is less than a higher threshold, the terminal preferentially measures the signal quality of at least one second cell belonging to the same network as the first cell. When the terminal determines that there is a second cell in the at least one second cell with signal quality exceeding a certain threshold compared with the signal quality of the first cell and the exceeding duration is longer than a shorter duration, the terminal sends a measurement report to the base station.

Only when the signal quality of each of the at least one second cell is lower than a certain threshold, the terminal measures the signal quality of at least one third cell, and when determining that there is a third cell in the at least one third cell with signal quality exceeding a certain threshold compared with the signal quality of the first cell and the exceeding duration is longer than a shorter duration, the terminal sends a measurement report to the base station.

For a terminal with a low movement speed, when the terminal determines that the signal quality of the first cell is less than a lower threshold, the terminal will preferentially measure the signal quality of at least one second cell belonging to the same network as the first cell. When the terminal determines that there is a second cell in the at least one second cell with signal quality exceeding a certain threshold compared with the signal quality of the first cell and the exceeding duration is greater than a longer duration, the terminal sends a measurement report to the base station.

Only when the signal quality of each of the at least one second cell is lower than a certain threshold, the terminal measures the signal quality of at least one third cell, and when determines that there is a third cell in the at least one third cell with signal quality exceeding a certain threshold compared with the signal quality of the first cell and the exceeding duration is greater than a longer duration, the terminal sends a measurement report to the base station.

For example, when a terminal is currently on a high-speed-railway, and the terminal currently accesses a first cell in a high-speed-railway dedicated network. In case that the speed of the high-speed-railway is slowed down, for example, when the high-speed-railway enters the station, the movement speed of the terminal is also slowed down, and the signal quality of the first cell accessed by the terminal is deteriorated. At this time, through the above method, the terminal preferentially measures the signal quality of the cells in the nearby high-speed-railway dedicated network to preferentially switch to the cells in the nearby high-speed-railway dedicated network. Only when the signal quality of each of the cells in the nearby high-speed-railway dedicated network is poor, the terminal measures the cells in the nearby public LTE network. Therefore, with the method according to the embodiment of the present disclosure, when the high-speed-railway enters the station, the terminal on the high-speed-railway can be effectively prevented from re-accessing the nearby public LTE network to avoid causing communication pressure on the nearby public LTE network.

At the same time, when the high-speed-railway is restarted, it can also prevent the terminal from frequently switching between different networks.

In the embodiment of the present disclosure, a terminal receives at least two pieces of measurement configuration information sent by a base station corresponding to a first cell after accessing the first cell, wherein the at least two pieces of measurement configuration information correspond to at least two speed intervals, so that the terminal can select target measurement configuration information from the at least two pieces of measurement configuration information according to its own movement speed, and perform network measurement according to the target measurement configuration information. That is, in the present disclosure, as the base station will send multiple pieces of measurement configuration information, the terminal can select appropriate measurement configuration information for network measurement according to its own situation, which improves the flexibility of the terminal for network measurement.

FIG. 4 is a block diagram of a network measurement device 400 according to an embodiment of the present disclosure. The device 400 is applied to a terminal. Referring to FIG. 4, the device 400 includes a receiving module 401, a selecting module 402, and a measuring module 403.

The receiving module 401 is configured to receive at least two pieces of measurement configuration information sent by a base station corresponding to a first cell after accessing the first cell, wherein the at least two pieces of measurement configuration information correspond to at least two speed intervals.

The selecting module 402 is configured to select target measurement configuration information from the at least two pieces of measurement configuration information according to the movement speed of the terminal.

The measuring module 403 is configured to perform network measurement according to the target measurement configuration information.

Optionally, the first cell is a cell in a first network, each piece of measurement configuration information includes a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to the second network among all neighboring cells of the first cell; and for each piece of measurement configuration information, the first measurement trigger event is that the signal quality of the first cell is less than a first threshold, the first measurement report trigger event is that there is a second cell in the at least one second cell with signal quality exceeding a second threshold compared with the signal quality of the first cell and an exceeding duration is longer than a first duration, the second measurement trigger event is that the signal quality of each of the at least one second cell is lower than a third threshold, the second measurement report trigger event is that there is a third cell in the at least one third cell with signal quality exceeding a fourth threshold compared with the signal quality of the first cell and an exceeding duration is longer than a second duration, and the first threshold, the first duration, and the second duration are respectively different in the different measurement configuration information, and the third threshold is less than the first threshold in the same measurement configuration information, Optionally, the measuring module 403 is further configured to:

measure the signal quality of each of the at least one second cell, when the signal quality of the first cell is less than the first threshold in the target measurement configuration information; and send a measurement report to the base station, in case that there is a second cell in the at least one second cell with signal quality exceeding the second threshold in the target measurement configuration information compared with the signal quality of the first cell and the exceeding duration is longer than the first duration in the target measurement configuration information, wherein the measurement report carries the signal quality of each of the at least one second cell.

Optionally, the measuring module 403 is further configured to:

measure the signal quality of each of the at least one third cell, in case that the signal quality of each of the at least one second cell is lower than the third threshold in the target measurement configuration information; and send a measurement report to the base station, when there is a third cell in the at least one third cell with signal quality exceeding the fourth threshold in the target measurement configuration information compared with the signal quality of the first cell and the exceeding duration is longer than the second duration in the target measurement configuration information wherein the measurement report carries the signal quality of each of the at least one third cell.

Optionally, the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

In the embodiment of the present disclosure, a terminal receives at least two pieces of measurement configuration information sent by a base station corresponding to a first cell after accessing the first cell, wherein the at least two pieces of measurement configuration information correspond to at least two speed intervals, so that the terminal can select target measurement configuration information from the at least two pieces of measurement configuration information according to its own movement speed, and perform network measurement according to the target measurement configuration information. That is, in the present disclosure, as the base station will send multiple pieces of measurement configuration information, the terminal can select appropriate measurement configuration information for network measurement according to its own situation, which improves the flexibility of the terminal for network measurement.

Regarding the device in the foregoing embodiment, the specific manner in which each module performs operations has been described in detail in the embodiment of the method, and will not be described in detail here.

Figure 5:
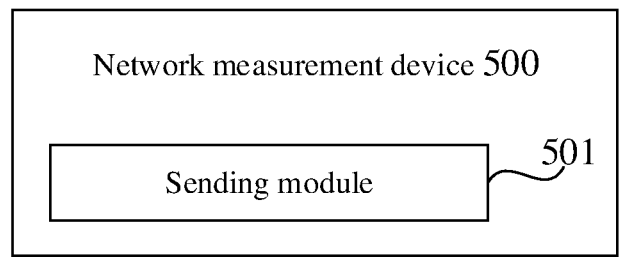
FIG. 5 is a block diagram of another network measurement device according to an embodiment of the present disclosure.

FIG. 5 is a block diagram of a network measurement device 500 according to an embodiment of the present disclosure. The device 500 is applied to a base station. Referring to FIG. 5, the device 500 includes a sending module 501.

The sending module 501 is configured to send at least two pieces of measurement configuration information to a terminal, wherein the at least two pieces of measurement configuration information correspond to at least two speed intervals and are configured to instruct the terminal to select target measurement configuration information for network measurement according to the movement speed of the terminal, and the terminal is a terminal that accesses a first cell corresponding to the base station.

Optionally, the first cell is a cell in a first network, each piece of measurement configuration information includes a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to the second network among all neighboring cells of the first cell; and for each piece of measurement configuration information, the first measurement trigger event is that the signal quality of the first cell is less than a first threshold, the first measurement report trigger event is that there is a second cell in the at least one second cell with signal quality exceeding a second threshold compared with the signal quality of the first cell and an exceeding duration is longer than a first duration, the second measurement trigger event is that the signal quality of each of the at least one second cell is lower than a third threshold, the second measurement report trigger event is that there is a third cell in the at least one third cell with signal quality exceeding a fourth threshold compared with the signal quality of the first cell and an exceeding duration is longer than a second duration, and the first threshold, the first duration, and the second duration are respectively different in the different measurement configuration information, and the third threshold is less than the first threshold in the same measurement configuration information.

Optionally, the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

In the embodiment of the present disclosure, a terminal receives at least two pieces of measurement configuration information sent by a base station corresponding to a first cell after accessing the first cell, wherein the at least two pieces of measurement configuration information correspond to at least two speed intervals, so that the terminal can select target measurement configuration information from the at least two pieces of measurement configuration information according to its own movement speed, and perform network measurement according to the target measurement configuration information. That is, in the present disclosure, as the base station will send multiple pieces of measurement configuration information, the terminal can select appropriate measurement configuration information for network measurement according to its own situation, which improves the flexibility of the terminal for network measurement.

Regarding the device in the foregoing embodiment, the specific manner in which each module performs operations has been described in detail in the embodiment of the method, and will not be described in detail here.

Figure 6:
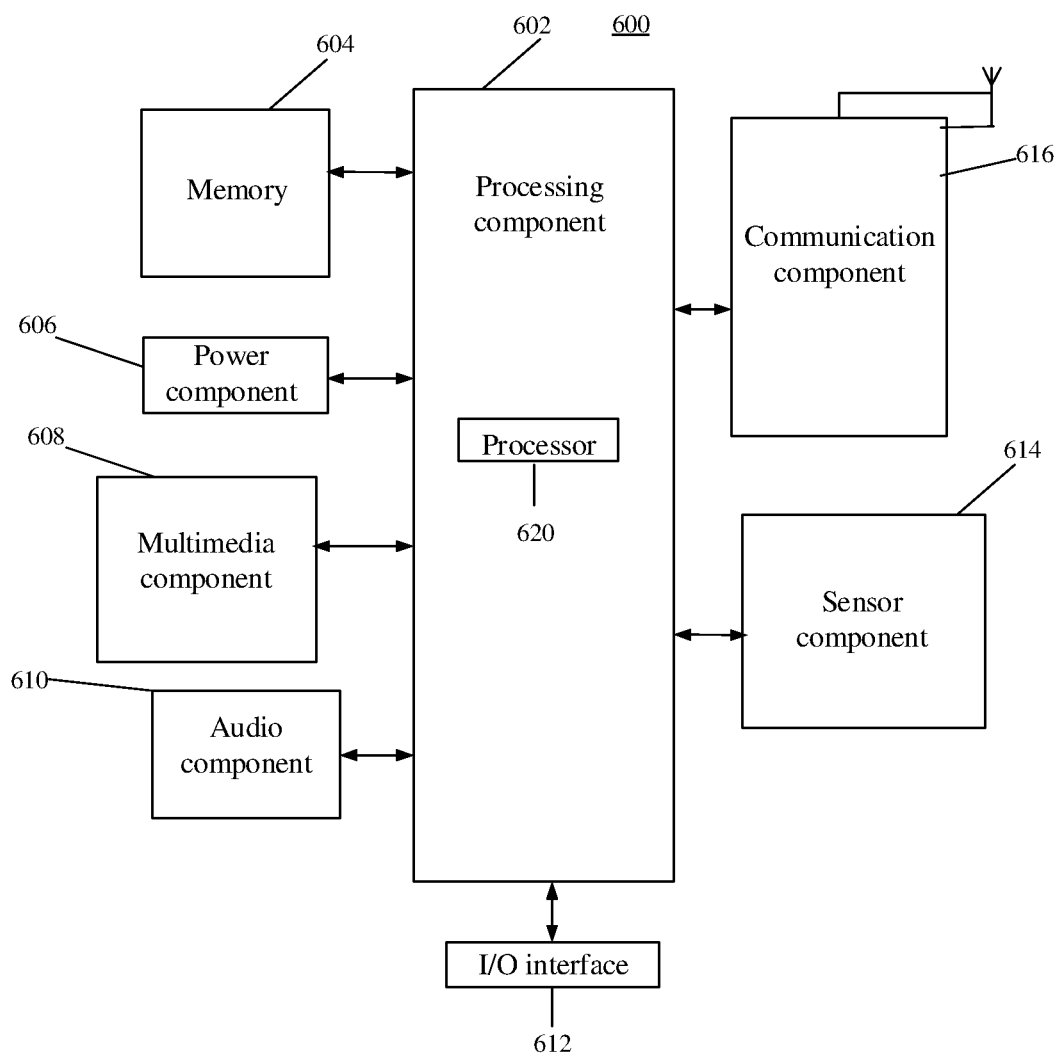
FIG. 6 is a block diagram of another network measurement device according to an embodiment of the present disclosure.

FIG. 6 is a block diagram showing a network measurement device 600 according to an exemplary embodiment. The apparatus 600 is applied in any terminal for network measurement according to the requirements. The terminal may be a mobile phone, a computer, a message transceiver device, a game console, a tablet device, a medical device, a fitness device or the like.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the apparatus 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, videos, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). In case that the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 608 includes a front camera and/or a rear camera. The front camera and/or the rear camera may receive external multimedia data while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive external audio signals when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and peripheral interface modules, such as a keyboard, a click wheel, buttons, and the like. The buttons may include, but are not limited to, a home button, a volume button, a start button, and a lock button.

The sensor component 614 includes one or more sensors to provide status assessments of various aspects of the apparatus 600. For instance, the sensor component 614 may detect an on/off status of the apparatus 600, relative positioning of components, for example, the component is a display and keyboard of the apparatus 600, and the sensor component 614 may also detect a position change of the apparatus 600 or a component of the apparatus 600, presence or absence of user contact with the apparatus 600, orientation or acceleration/deceleration of the apparatus 600, and temperature change of the apparatus 600. The sensor component 614 may include a proximity sensor configured to detect the presence of nearby objects without any physical contact. The sensor component 614 may also include a light sensor, such as a CMOS or CCD image sensor, used for imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as Wi-Fi, 2G, or 3G, or a combination thereof. In an exemplary embodiment, the communication component 616 receives broadcast signals or broadcast associated information from an external broadcast management system via a broadcast channel. In an exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 604 including instructions, executable by the processor 620 in the apparatus 600, to perform the above-described methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a terminal, the terminal can execute the above network measurement method provided by the above-mentioned embodiments.

In an exemplary embodiment, a computer program product including instructions is also provided. When the computer program product is run on a terminal, the terminal can execute the network measurement method provided by the above-mentioned embodiments.

In an exemplary embodiment, a computer program product including instructions is also provided. When the computer program product is run on a terminal, the terminal can execute the network measurement method provided by the above-mentioned embodiments.

Figure 7:
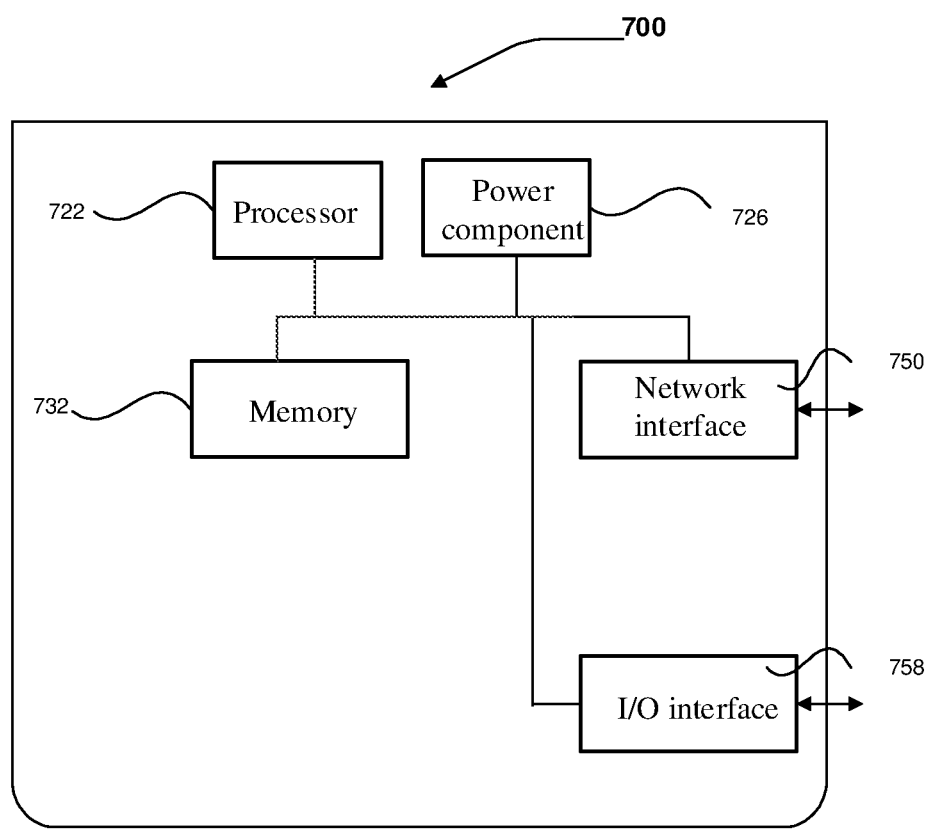
FIG. 7 is a block diagram of another network measurement device according to an embodiment of the present disclosure.

FIG. 7 is a block diagram of a network measurement device 700 according to an embodiment of the present disclosure. The apparatus is applied in a base station. With reference to FIG. 7, the apparatus 700 includes a processor 722 including one or more processors and memory resources represented by a memory 732 for storing instructions executable by the processor 722, for example an application program. The application program stored in the memory 732 may include one or more modules, each of which corresponds to a set of instructions. Further, the processor 722 is configured to execute instructions to perform the network measurement method provided by the above-mentioned embodiments.

The apparatus 700 may further include a power source 726 for performing power management for the apparatus 700, a wired or wireless network interface 750 configured for connecting the apparatus 700 to a network, and an input/output interface 758. The apparatus 700 can operate an operating system stored in the memory 732, such as Windows Server™, Mac OS X™, Unix™, Linux™, FreeBSD™ or the like.

In exemplary embodiments, a non-transitory computer readable storage medium including instructions is also provided, such as the memory 732 including instructions, executable by the processor 722 in the apparatus 700, for performing the above-mentioned methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a base station, the base station can be caused to execute the network measurement method provided by the above-mentioned embodiments.

In an exemplary embodiment, a computer program product including instructions is also provided. When the computer program product is run on a base station, the base station can be caused to execute the network measurement method provided by the above-mentioned embodiments.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A network measurement method, applied to a terminal, comprising:
   receiving at least two pieces of measurement configuration information sent by a base station corresponding to a first cell after accessing the first cell, wherein the at least two pieces of measurement configuration information correspond to at least two speed intervals;
   selecting target measurement configuration information from the at least two pieces of measurement configuration information according to a movement speed of the terminal; and
   performing network measurement according to the target measurement configuration information,
   wherein the first cell is a cell in a first network, each piece of measurement configuration information comprises a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to a second network among all neighboring cells of the first cell, and
   for each piece of measurement configuration information, the first measurement trigger event is that signal quality of the first cell is less than a first threshold, the first measurement report trigger event is that there is a second cell in the at least one second cell with signal quality, compared with the signal quality of the first cell, exceeding a second threshold for a duration longer than a first duration, the second measurement trigger event is that signal quality of each of the at least one second cell is lower than a third threshold, the second measurement report trigger event is that there is a third cell in the at least one third cell with signal quality, compared with the signal quality of the first cell, exceeding a fourth threshold for a duration longer than a second duration, and wherein the first threshold, the first duration, and the second duration are respectively different in the different measurement configuration information, and the third threshold is less than the first threshold in the same measurement configuration information.

2. The method according to claim 1, wherein performing network measurement according to the target measurement configuration information comprises:
   measuring the signal quality of each of the at least one second cell, when the signal quality of the first cell is less than the first threshold in the target measurement configuration information; and
   sending a measurement report to the base station, in case that there is a second cell in the at least one second cell with signal quality, compared with the signal quality of the second cell, exceeding the second threshold in the target measurement configuration information for a duration longer than the first duration in the target measurement configuration information, wherein the measurement report carries the signal quality of each of the at least one second cell.

3. The method according to claim 2, wherein after measuring the signal quality of each of the at least one second cell, the method further comprises:
   measuring signal quality of each of the at least one third cell, in case that the signal quality of each of the at least one second cell is lower than the third threshold in the target measurement configuration information; and
   sending a measurement report to the base station, when there is a third cell in the at least one third cell with signal quality, compared with the signal quality of the first cell, exceeding the fourth threshold in the target measurement configuration information for a duration longer than the second duration in the target measurement configuration information, wherein the measurement report carries the signal quality of each of the at least one third cell.

4. The method according to claim 1, wherein the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

5. The method according to claim 1, wherein the first duration in the measurement configuration information corresponding to a speed interval with a value higher than the preset speed is less than the first duration in the measurement configuration information corresponding to a speed interval with a value lower than the preset speed.

6. The method according to claim 1, wherein the second duration in the measurement configuration information corresponding to a speed interval with a value higher than the preset speed is less than the second duration in the measurement configuration information corresponding to a speed interval with a value lower than the preset speed.

7. A network measurement method, applied to a base station, comprising:
   sending at least two pieces of measurement configuration information to a terminal, wherein the at least two pieces of measurement configuration information correspond to at least two speed intervals and are configured to instruct the terminal to select target measurement configuration information for network measurement according to a movement speed of the terminal, and the terminal is a terminal that accesses a first cell corresponding to the base station, wherein the first cell is a cell in a first network, each piece of measurement configuration information comprises a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to a second network among all neighboring cells of the first cell, and for each piece of measurement configuration information, the first measurement trigger event is that signal quality of the first cell is less than a first threshold, the first measurement report trigger event is that there is a second cell in the at least one second cell with signal quality, compared with the signal quality of the first cell, exceeding a second threshold for a duration longer than a first duration, the second measurement trigger event is that signal quality of each of the at least one second cell is lower than a third threshold, the second measurement report trigger event is that there is a third cell in the at least one third cell with signal quality, compared with the signal quality of the first cell, exceeding a fourth threshold for a duration longer than a second duration, and wherein the first threshold, the first duration, and the second duration are respectively different in the different measurement configuration information, and the third threshold is less than the first threshold in the same measurement configuration information.

8. The method according to claim 7, wherein the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

9. A terminal, comprising:
a processor; and
a memory storing instructions executable by the processor;
wherein the processor is configured to:
receive at least two pieces of measurement configuration information sent by a base station corresponding to a first cell after accessing the first cell, wherein the at least two pieces of measurement configuration information correspond to at least two speed intervals;
select target measurement configuration information from the at least two pieces of measurement configuration information according to a movement speed of the terminal; and
perform network measurement according to the target measurement configuration information, wherein the first cell is a cell in a first network, each piece of measurement configuration information comprises a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to a second network among all neighboring cells of the first cell, and for each piece of measurement configuration information, the first measurement trigger event is that signal quality of the first cell is less than a first threshold, the first measurement report trigger event is that there is a second cell in the at least one second cell with signal quality, compared with the signal quality of the first cell, exceeding a second threshold for a duration longer than a first duration, the second measurement trigger event is that signal quality of each of the at least one second cell is lower than a third threshold, the second measurement report trigger event is that there is a third cell in the at least one third cell with signal quality, compared with the signal quality of the first cell, exceeding a fourth threshold for a duration longer than a second duration, and wherein the first threshold, the first duration, and the second duration are respectively different in the different measurement configuration information, and the third threshold is less than the first threshold in the same measurement configuration information.

10. The terminal according to claim 9, wherein the processor is further configured to:
measure the signal quality of each of the at least one second cell, when the signal quality of the first cell is less than the first threshold in the target measurement configuration information; and
send a measurement report to the base station, in case that there is a second cell in the at least one second cell with signal quality, compared with the signal quality of the first cell, exceeding the second threshold in the target measurement configuration information for a duration longer than the first duration in the target measurement configuration information, wherein the measurement report carries the signal quality of each of the at least one second cell.

11. The terminal according to claim 10, wherein the processor is further configured to:
measure signal quality of each of the at least one third cell, in case that the signal quality of each of the at least one second cell is lower than the third threshold in the target measurement configuration information; and
send a measurement report to the base station, when there is a third cell in the at least one third cell with signal quality, compared with the signal quality of the first cell, exceeding the fourth threshold in the target measurement configuration information for a duration longer than the second duration in the target measurement configuration information, wherein the measurement report carries the signal quality of each of the at least one third cell.

12. The terminal according to claim 9, wherein the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

13. The terminal according to claim 9, wherein the first duration in the measurement configuration information corresponding to a speed interval with a value higher than the preset speed is less than the first duration in the measurement configuration information corresponding to a speed interval with a value lower than the preset speed.

14. The terminal according to claim 9, wherein the second duration in the measurement configuration information corresponding to a speed interval with a value higher than the preset speed is less than the second duration in the measurement configuration information corresponding to a speed interval with a value lower than the preset speed.

15. A base station, comprising:
a processor; and
a memory storing instructions executable by the processor;
wherein the processor is configured to send at least two pieces of measurement configuration information to a terminal, wherein the at least two pieces of measurement configuration information correspond to at least two speed intervals and are configured to instruct the terminal to select target measurement configuration information for network measurement according to the movement speed of the terminal, and the terminal is a terminal that accesses a first cell corresponding to the base station,
wherein the first cell is a cell in a first network, each piece of measurement configuration information comprises a first measurement trigger event, a first measurement report trigger event, at least one second cell to be measured corresponding to the first measurement trigger event, a second measurement trigger event, a second measurement report trigger event, and at least one third cell to be measured corresponding to the second measurement trigger event, the at least one second cell is a neighboring cell belonging to the first network among all neighboring cells of the first cell, and the at least one third cell is a neighboring cell belonging to a second network among all neighboring cells of the first cell, and for each piece of measurement configuration information, the first measurement trigger event is that signal quality of the first cell is less than a first threshold, the first measurement report trigger event is that there is a second cell in the at least one second cell with signal quality, compared with the signal quality of the first cell, exceeding a second threshold for a duration longer than a first duration, the second measurement trigger event is that signal quality of each of the at least one second cell is lower than a third threshold, the second measurement report trigger event is that there is a third cell in the at least one third cell with signal quality, compared with the signal quality of the first cell, exceeding a fourth threshold for a duration longer than a second duration, and wherein the first threshold, the first duration, and the second duration are respectively different in the different measurement configuration information, and the third threshold is less than the first threshold in the same measurement configuration information.

16. The base station according to claim 15, wherein the first threshold in the measurement configuration information corresponding to a speed interval with a value higher than a preset speed is greater than the first threshold in the measurement configuration information corresponding to a speed interval with a value lower than the preset speed, the first duration in the measurement configuration information corresponding to a speed interval with a value higher than the preset speed is less than the first duration in the measurement configuration information corresponding to a speed interval with a value lower than the preset speed, and the second duration in the measurement configuration information corresponding to a speed interval with a value higher than the preset speed is less than the second duration in the measurement configuration information corresponding to a speed interval with a value lower than the preset speed.

* * * * *